US005245757A

United States Patent [19]

Weissert et al.

[11] Patent Number: 5,245,757

[45] Date of Patent: Sep. 21, 1993

[54] MOTOR-DRIVEN CHAIN SAW HAVING A GRAB HANDLE

[75] Inventors: Wolfgang Weissert, Winnenden; Roland Schierling, Affalterbach, both of Fed. Rep. of Germany

[73] Assignee: Andreas Stihl, Waiblingen, Fed. Rep. of Germany

[21] Appl. No.: 22,329

[22] Filed: Feb. 25, 1993

[30] Foreign Application Priority Data

Feb. 27, 1992 [DE] Fed. Rep. of Germany ....... 4205986

[51] Int. Cl.[5] ............................................ B23D 57/00

[52] U.S. Cl. ......................................... 30/383; 30/381

[58] Field of Search .......... 30/383, 381, 382, 384–387; 16/111 R

[56] References Cited

U.S. PATENT DOCUMENTS

| | | | |
|---|---|---|---|
| 4,290,465 | 9/1981 | Fee et al. | 16/111 R |
| 4,389,779 | 6/1983 | Overbury et al. | 30/382 |
| 4,611,401 | 9/1986 | Piller | 30/383 |
| 4,639,029 | 1/1987 | Kolonia | 16/111 R |
| 4,683,659 | 8/1987 | Wünsch et al. | 30/381 |
| 4,964,192 | 10/1990 | Marui | 16/111 R |

*Primary Examiner*—Douglas D. Watts

*Assistant Examiner*—Hwei-Siu Payer

*Attorney, Agent, or Firm*—Walter Ottesen

[57] ABSTRACT

The invention relates to a motor-driven chain saw having a motor mounted in a housing for driving a saw chain on a guide bar. The guide bar extends forwardly in the longitudinal direction of the chain saw from a forward housing end face. The housing is held by a grab handle for holding and guiding the chain saw. The handle has an upper segment projecting over the housing transversely to the longitudinal center axis of the guide bar. The upper segment extends at one end with a transition segment into a lateral segment lying approximately parallel to the plane of the guide bar and next to the housing. The cross section of the upper segment and the cross section of the lateral segment are configured in a shape which departs from the circular shape and are approximately the same. This affords an ergonomically advantageous hold and increases the operational safety. The major cross-sectional axis of the lateral segment lies approximately perpendicularly to the plane of the guide bar and the same cross-sectional axis in the upper segment lies at an angle of less than 90° to a reference plane which extends at right angles in the longitudinal center axis of the guide bar at right angles to the plane of the guide bar.

10 Claims, 3 Drawing Sheets

11
35
36
23
28
17
37
24
25
26
27
20
21
22
29
38
Y
Z
X
34
30
31
40
32
50
h
H

MOTOR-DRIVEN CHAIN SAW HAVING A GRAB HANDLE

BACKGROUND OF THE INVENTION

It is known to provide motor-driven chain saws with a rearward handle aligned in the longitudinal direction of the chain saw and a forward handle so that the operator can securely guide and hold the chain saw. The chain saw can be held in another operating position depending upon the particular use such as cutting a tree at the base or removing branches. The operator must then grasp the forward handle at different locations along its periphery.

The forward hand of the operator must grasp the handle at a lateral segment thereof when cutting trees at the base thereof so that the guide bar is substantially horizontal; whereas, the operator must grasp the forward handle at a top segment thereof when removing branches. In the last case, the plane of the guide bar is vertical and the guide bar is inclined downwardly.

The operator can experience muscular cramps and pain in the hand joints and otherwise not feel well especially during long continuous work, the above discomfort often being caused by incorrectly holding the chain saw. An incorrect holding also however affects operational safety.

SUMMARY OF THE INVENTION

It is an object of the invention to provide a motor-driven chain saw which is improved so that an operator can guide the motor-driven chain saw with the best possible manipulation.

The motor-driven chain saw of the invention includes: a housing having a front end face; a guide bar extending forwardly from the front end face and having a peripheral edge; the guide bar defining a guide bar plane and having a longitudinal axis; the longitudinal axis being in a reference plane extending perpendicularly to the guide bar plane; a closed saw chain mounted on the guide bar so as to be moveable around the peripheral edge thereof; drive means mounted in the housing for driving the saw chain; a grab handle attached to the housing for enabling an operator to hold and guide the chain saw during operational use thereof; the grab handle including an upper segment having first and second ends; the upper segment being disposed above the housing and extending transversely to the longitudinal axis; the grab handle further including a lateral segment disposed next to the housing approximately parallel to the guide bar plane; a transition segment extending from the second end to the lateral segment thereby connecting the upper segment to the lateral segment; the upper segment and the lateral segment having respective cross sections which are approximately the same; each of the cross sections having a shape departing from a circular shape; the shape defining a major axis and a minor axis; the major axis of the cross section of the lateral segment being approximately perpendicular to the guide bar plane; and, the major axis of the cross section of the upper segment and the reference plane conjointly defining an angle of less than 90°.

A shape of the cross section of the forward handle which departs from the circular form ensures an ergonomic adaptation to the closed hand. Furthermore, the orientation or alignment of the major cross-sectional axis in the lateral segment makes it necessary for the operator to guide the chain saw precisely horizontally which also increases safety when cutting trees in addition to providing an ergonomically advantageous hold.

The major cross-sectional axis in the upper segment is aligned or orientated with an angle of less than 90° (preferably 40° to 42°) to a reference plane which extends at right angles to the plane of the guide bar and through the longitudinal center axis of the guide bar. This ensures that, when holding the motor-driven chain saw at the upper segment of the forward handle, the optimal operating position of the chain saw for cutting branches is guaranteed in that the guide bar is disposed in a vertical plane and is inclined forwardly and downwardly. The configuration of the grab handle ensures that the operator automatically holds the motor-driven chain saw in the position most favorable for the particular work whereby, on the one hand, the stress on the body of the operator is significantly reduced and, on the other hand, an increase in safety during the work to be done is obtained.

According to another feature of the invention, the cross section is approximately elliptical in shape with the minor cross-sectional axis partitioning the cross section in two halves of different heights. The cross-sectional half having the lesser height faces toward the guide bar whereby a grasping of the grab handle by the fingers of the operator is possible in the most optimal manner.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
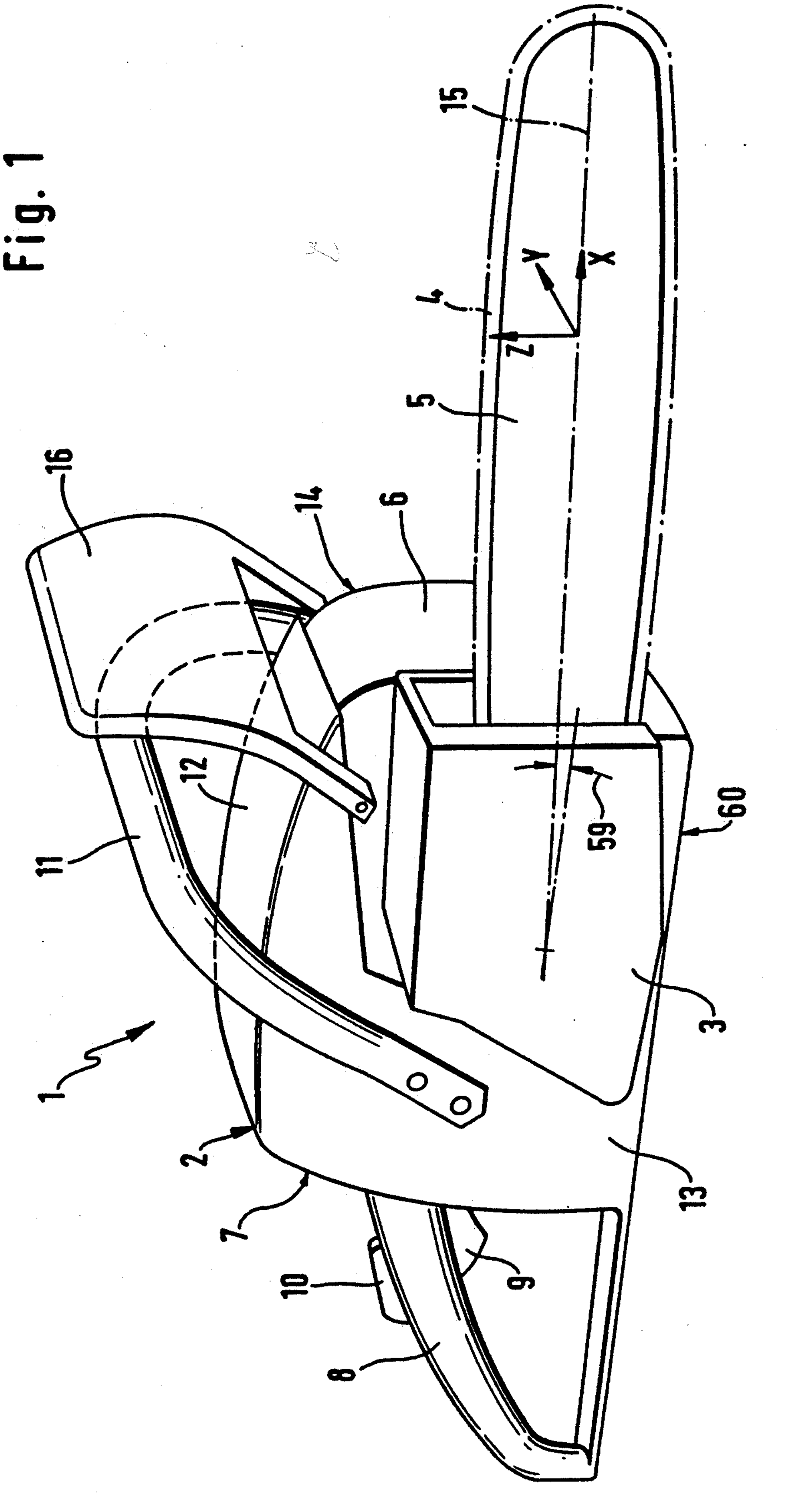
FIG. 1 is a perspective view of a motor-driven chain saw equipped with a grab handle according to the invention.

The motor-driven chain saw 1 of FIG. 1 includes a housing 2 wherein a drive motor (not shown) is mounted. This drive motor drives a saw chain 4 via a sprocket wheel covered by a sprocket-wheel cover 3. The saw chain runs on the guide bar 5. The guide bar 5 extends forwardly in the longitudinal direction of the chain saw 1 from the forward end face 6 of the housing. A rearward handle 8 is mounted on the housing end face 7 facing away from the guide bar. The handle 8 extends in the longitudinal direction of the chain saw and includes a throttle lever 9 as well as a throttle-lever lock 10 for the internal combustion engine mounted in the housing 1. The longitudinal center axis 15 of the guide bar 5 extends in the x-direction of a spatial coordinate system. The x/y-plane is defined by the axes x and y and lies inclined upwardly at an angle 59 of 3° to 5° to the base surface 60 of the housing 2 as shown.

A grab handle 11 is arranged in the forward region of the chain saw and extends from the housing side 13 having the sprocket-wheel cover 3 over the top side 12 of the housing to the other housing side 14 where the grab handle is attached below the housing 2. The other end of the grab handle 11 is fixed to the housing side 13.

It can also be advantageous to configure the grab handle so as to be closed so that the two ends of the grab handle are brought together below the housing 2.

A handguard 16 is journalled forward of the grab handle 11 and is provided to coact with a braking device for bringing the saw chain 4 to standstill in a manner not shown herein.

Figure 2:
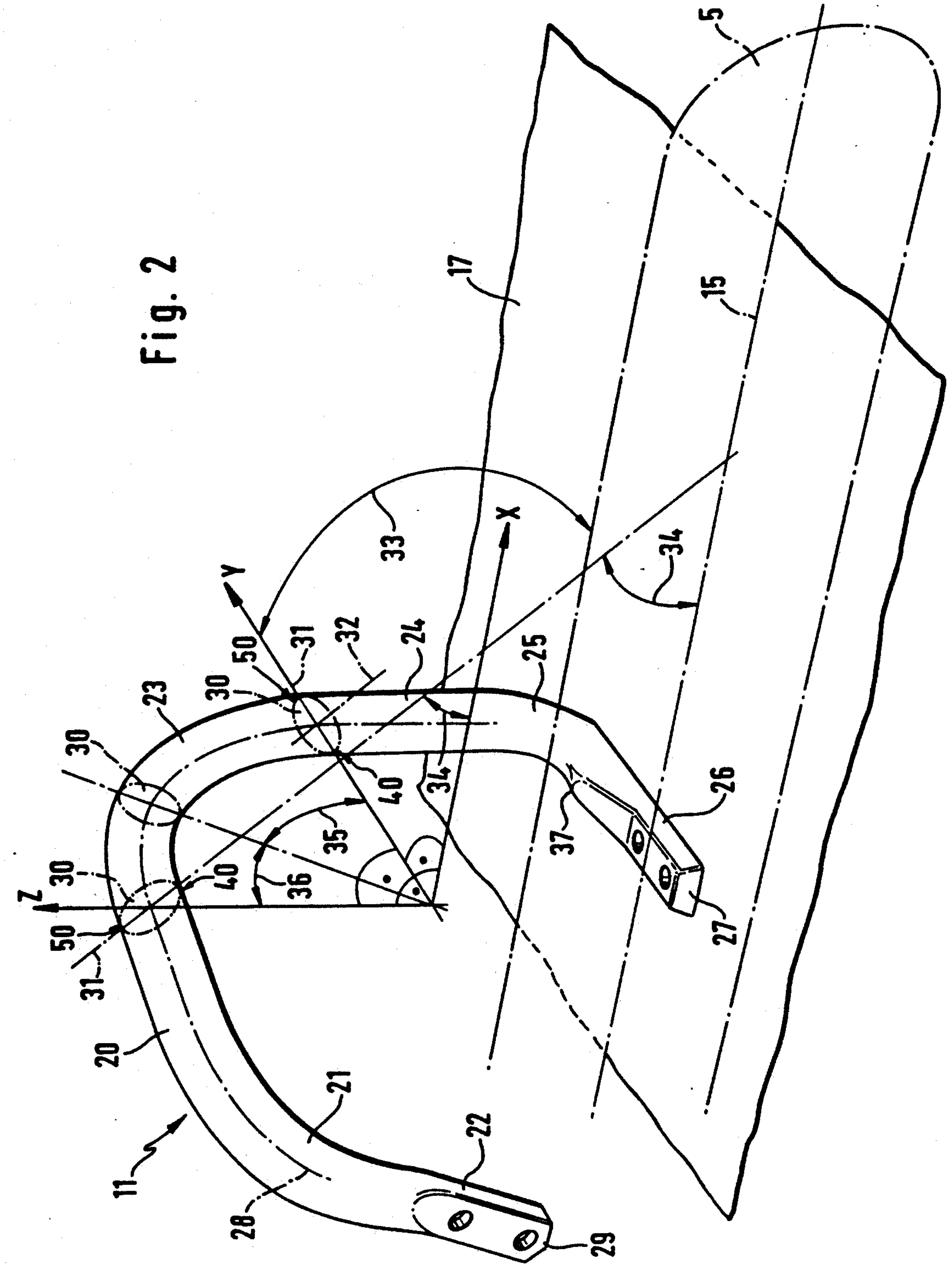
FIG. 2 is a perspective view of the grab handle shown in FIG. 1.
Figures 3, 4, 5:
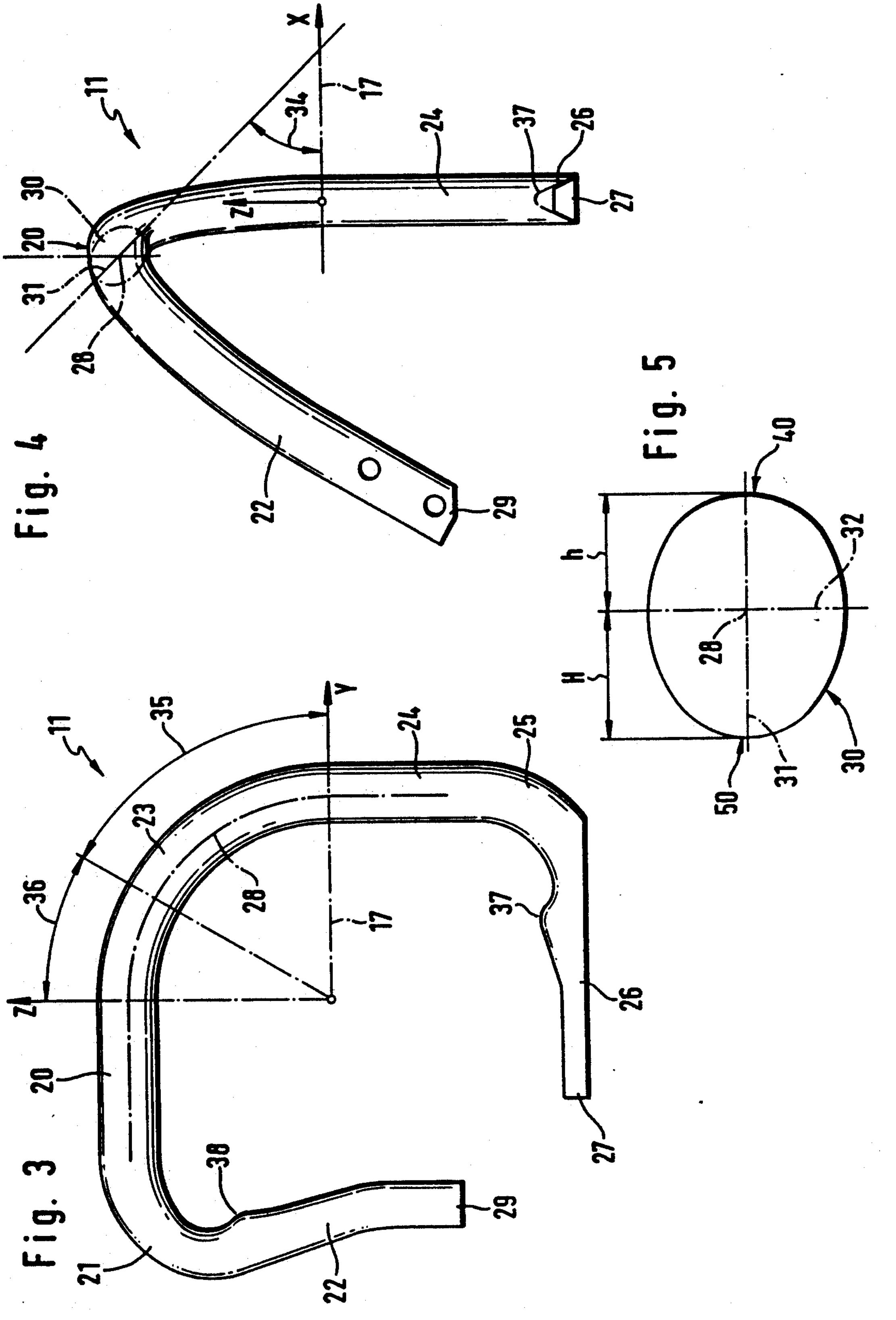
FIG. 3 is a front elevation view of the grab handle of FIG. 2.
FIG. 4 is a side elevation view of the grab handle of FIG. 2.
FIG. 5 is an enlarged cross section of the grab handle.

The configuration and arrangement of the grab handle 11 can be seen from FIGS. 2 to 4. The grab handle 11 includes an upper segment 20 which extends transversely to the longitudinal center axis 15 of the guide bar 5 at a spacing above the housing top surface 12 and over a quarter-circle arc transition segment 21 to one end having an attachment segment 22 which is fixed to the housing side 13. At its other end, the upper segment 20 extends via a transition segment 23 to a lateral segment 24. The transition segment 23 is configured as a quarter-circle arc and the lateral segment 24 runs approximately parallel to the plane of the guide bar 5 laterally spaced next to the housing side 14. The lateral segment 24 continues into a quarter-circle arc transition segment 25 which ends in an attachment segment 26. As shown in FIG. 3, the attachment segment 26 lies parallel to the upper segment 20 and engages the housing 2 at the bottom thereof.

As shown in FIGS. 2 and 5, the cross section 30 of the grab handle has a shape departing from a circular form with a large or major cross-sectional axis 31 and a small or minor cross-sectional axis 32. The cross section 30 has an elliptical-like shape in the embodiment shown.

The lateral segment 24 is configured in such a manner that the major cross-sectional axis 31 lies perpendicularly to the plane defined by the guide bar 5. This is shown by the angle 33 in FIG. 2. In the upper segment 20 of the grab handle 11, the cross section 30 lies so as to be rotated with reference to the position of the cross section 30 in the lateral segment 24. The major cross-sectional axis 31 lies at an angle 34 to a reference plane 17 with the reference plane 17 extending at right angles to the plane of the guide bar 5 and in the longitudinal center axis 15 thereof.

Referred to the spatial coordinate system shown, the reference plane 17 lies parallel to the x/y-plane; whereas, the plane defined by the guide bar 5 lies parallel to the x/z-plane. The lateral segment 24 as well as the transition segment 23 lie approximately in the y/z-plane; whereas, the upper segment extends rearwardly out of this y/z-plane at a small angle.

In the embodiment shown, the angle 34 has a value which lies in the range of 40° to 42°. The rotation of the cross section 30 from its position in the lateral segment 24 into the position in the upper segment 20 is a rotation about the longitudinal center axis 28 of the grab handle 11. The transition from the lateral segment 24 into the upper segment 20 is uniform.

In the embodiment shown, the transition segment 23 has the shape of a quarter arc and lies in the y/z-plane. This transition segment 23 is configured to have a cross section corresponding to the cross section of the lateral segment 24 over an angle 35 of preferably 60°. The position of the cross section 30 referred to the longitudinal center axis 28 of the grab handle 11 is unchanged. The rotation of the cross section 30 out of the position in the lateral segment into the position of the upper segment 20 only takes place over angle 36 of preferably 30°. In the upper segment 20, the major cross-sectional axis 31 is at an angle 34 of preferably 40° to 42° to the x/y-plane. The selected configuration of the transition segment 23 ensures that the angle 35 of approximately 60° of the transition segment 23 is associated with the grab region of the lateral segment 24; whereas, the angle 36 of the transition segment 23 can be assigned to the grab region of the upper segment 20 because of the continuous rotation of the cross section 30 about the longitudinal center axis 28 into the position of the cross section 30 in the upper segment 20.

The quarter-circle arc transition segment 25 continues at the other end of the lateral segment 24 and extends to the transition into the attachment segment 26 from the cross section 30 of the lateral segment 24 into the cross section of the attachment segment 26 which is adapted for attachment. As shown in FIG. 2 to FIG. 4, the attachment segment ends in an end piece 27 having a trapezoidal shape when viewed in cross section. The attachment segment 26 is separated from the quarter-circle arc transition segment 25 by a stop 37 to prevent the hand of the operator from slipping into the region of the end piece 27. The stop 37 is formed on the inner side of the attachment segment 26 which faces toward the upper segment 20.

A quarter-circle arc transition segment 21 continues at the free end of the upper segment 20 in correspondence to the connection of the quarter-circle arc transition segment 25 to the lateral segment 24. The quarter-circle arc transition segment 21 continues into the attachment segment 22. The attachment segment 22 is separated from the quarter-circle arc transition segment 21 by a stop 38 (see FIG. 3) facing toward the lateral segment 24. The stop 38 is intended to prevent a slippage of the hand of the operator into the gap defined by the housing 2 of the chain saw and the attachment segment 22. This gap is formed because only the end piece 29 of the attachment segment 22 lies against the housing 2; whereas, the end of the attachment segment 22 facing toward the quarter-circle arc transition segment 21 departs at an angle from the housing side 13. The quarter-circle arc transition segment 21 lies at a lateral spacing to the housing side 13.

The exact shape of the cross section 30 is seen in FIG. 5. The major cross-sectional axis 31 lies at right angles to the minor cross-sectional axis 32 with the cross section being symmetrical to the major cross-sectional axis 31 but asymmetrical to the minor cross-sectional axis 32. The cross section 30 therefore has a blunt half 40 and a less blunted or peaked half 50 referred to the minor cross-sectional axis 32. The blunt half 40 has a lesser height (h) measured at right angles to the minor cross-sectional axis 32 than the height (H) of the peaked half 50 measured in the same manner. The contour of the cross section is made up from component radians.

Referring to the embodiment of FIG. 2, the blunt half 40 of the cross section 30 faces toward the guide bar 5 in the cross-sectional position in the lateral segment 24 as well as in the cross-sectional position in the top segment 20.

It is understood that the foregoing description is that of the preferred embodiments of the invention and that various changes and modifications may be made thereto without departing from the spirit and scope of the invention as defined in the appended claims.

What is claimed is:

1. A motor-driven chain saw comprising:

a housing having a front end face;

a guide bar extending forwardly from said front end face and having a peripheral edge;

said guide bar defining a guide bar plane and having a longitudinal axis;

said longitudinal axis being in a reference plane extending perpendicularly to said guide bar plane;

a closed saw chain mounted on said guide bar so as to be moveable around said peripheral edge thereof;

a grab handle attached to said housing for enabling an operator to hold and guide the chain saw during operational use thereof;

said grab handle including an upper segment having first and second ends;

said upper segment being disposed above said housing and extending transversely to said longitudinal axis;

said grab handle further including a lateral segment disposed next to said housing approximately parallel to said guide bar plane;

a transition segment extending from said second end to said lateral segment thereby connecting said upper segment to said lateral segment;

said upper segment and said lateral segment having respective cross sections which are approximately the same;

each of said cross sections having a shape departing from a circular shape;

said shape defining a major axis and a minor axis;

the major axis of the cross section of said lateral segment being approximately perpendicular to said guide bar plane; and, the major axis of said cross section of said upper segment and said reference plane conjointly defining an angle of less than 90°.

2. The motor-driven chain saw of claim 1, said angle being in the range of approximately 40° to 42°.

3. The motor-driven chain saw of claim 1, said grab handle defining a longitudinal center handle axis; the cross section of said lateral segment having a first orientation about said handle axis; said transition segment having a cross section corresponding in shape to the cross sections of said upper and lateral segments; and, said transition segment being configured so as to cause said cross section thereof to be rotated about said longitudinal center handle axis of said grab handle to have a second orientation about the handle axis different than said first orientation.

4. The motor-driven chain saw of claim 3, said transition segment being a curved segment defining a center of curvature and having first and second portions; said first portion extending from said second end of said upper segment into said second portion and said second portion extending into said lateral segment; said first portion extending over a first angle of approximately 30°; and, the cross section of said transition segment having an orientation on said handle axis corresponding to said first orientation where said first portion is joined to said second portion.

5. The motor-driven chain saw of claim 3, wherein the rotation of the cross section in said transition segment from said first orientation to said second orientation is uniform.

6. The motor-driven chain saw of claim 1, wherein the shape of said cross sections is an elliptical-like shape.

7. The motor-driven chain saw of claim 1, wherein said shape is symmetrical with respect to said major axis and asymmetrical with respect to said minor axis.

8. The motor-driven chain saw of claim 1, said minor axis partitioning said cross section into first and second portions having first and second elevations (h, H), respectively; and, said elevations being different from each other.

9. The motor-driven chain saw of claim 8, said grab handle defining a longitudinal center handle axis; the elevation (h) of said first portion being less than the elevation (H) of said second portion; the cross section of said grab handle being disposed along said handle axis so as to cause said first portion to face toward said guide bar along the entire length of said handle axis.

10. The motor-driven chain saw of claim 1, said grab handle having first and second stops formed thereon to delimit a region therebetween where the operator can grab and hold said grab handle.

* * * * *